C. T. DARLING.
ANIMAL TRAP.
APPLICATION FILED MAR. 28, 1913.

1,084,071.

Patented Jan. 13, 1914.

Witnesses

Inventor
Charles T. Darling
By Victor J. Evans
Attorney

COLUMBIA PLANOGRAPH CO., WASHINGTON, D. C.

UNITED STATES PATENT OFFICE.

CHARLES T. DARLING, OF STONY BROOK, NEW YORK.

ANIMAL-TRAP.

1,084,071.

Specification of Letters Patent.

Patented Jan. 13, 1914.

Application filed March 28, 1913. Serial No. 757,474.

*To all whom it may concern:*

Be it known that I, CHARLES T. DARLING, a citizen of the United States, residing at Stony Brook, Long Island, in the county of Suffolk and State of New York, have invented new and useful Improvements in Animal-Traps, of which the following is a specification.

The general object of the invention is to refine the construction of mouse or rat traps in point of general efficiency. And to this end the invention resides in so arranging a pivoted platform and a pivoted bait holder as to have these yield and move relatively to each other when pressed simultaneously by the animal, whereby, to effect the overbalancing of the animal and the forming of a passage sufficiently large to allow the animal falling therethrough and into a liquid-holding receptacle located beneath the platform.

Other objects will appear and be better understood from that embodiment of my invention of which the following is a specification, reference being had to the accompanying drawings forming part hereof, in which:—

Figure 1:
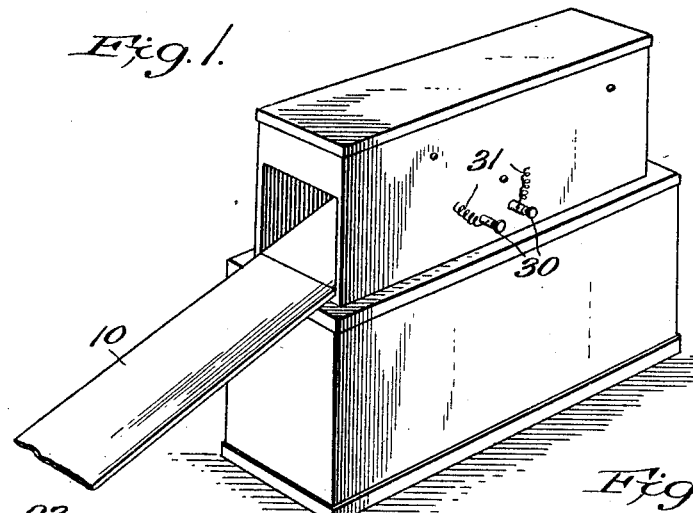
Figure 2:
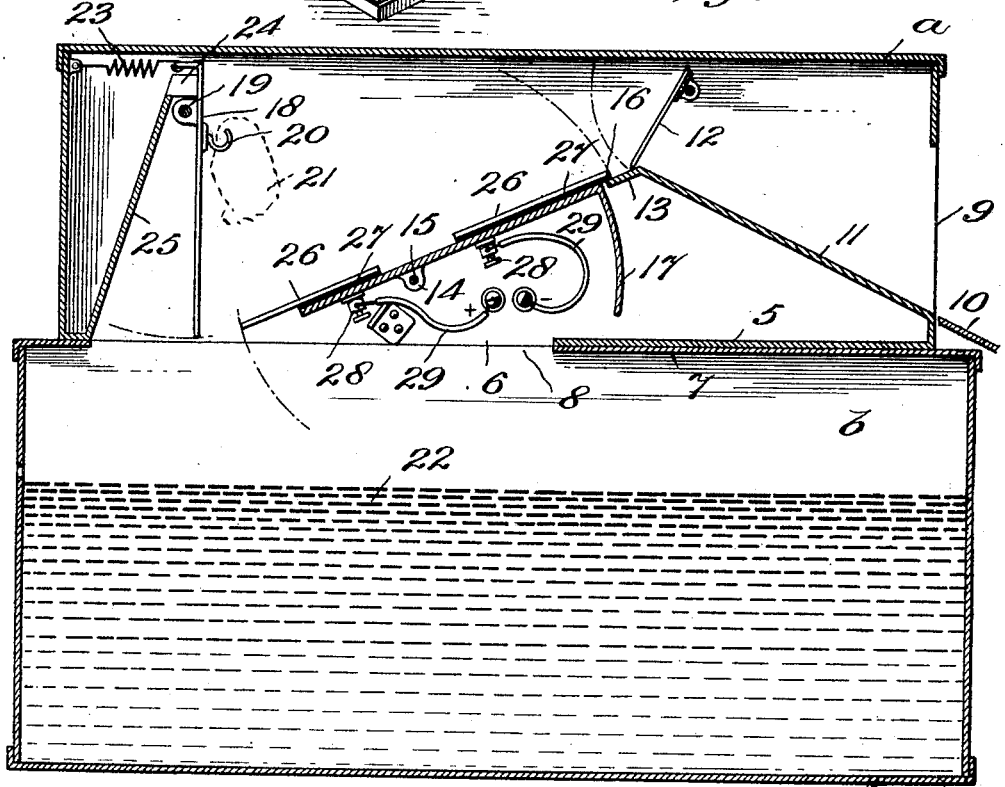
Figure 3:
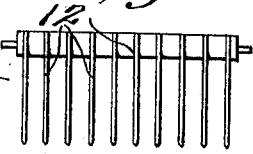

Figure 1 is a perspective view of the device. Fig. 2 is a detail vertical longitudinal section. Fig. 3 is an elevational view of a gate used in the trap.

*a* indicates the casing of the trap which may be formed of any material found suitable for the purpose, as metal, and *b* indicates generally a liquid-holding receptacle. A portion of the bottom 5 of the casing is cut away to provide an enlarged opening 6 and a corresponding portion of the top 7 of the receptacle is cut away to provide an opening 8 which registers with the opening 6 when the casing is superimposed upon the top 7 of the receptacle, as shown in the drawings.

Access to the interior of the casing is had through the entrance opening 9 and the animal approaches this opening by passing over an inclined plank 10 which is supported by the floor or other base upon which the trap rests, and the trap itself as shown in the drawings. An upwardly inclined runway 11 is suitably secured within the casing and arranged so as to form a continuation of the plank 10. A wicket or gate 12 is pivotally mounted within the casing *a* and extends into the path of the runway 11. As shown in Fig. 2, the upper end portion 13 of the runway is bent so as to function as a ledge for the lower end of the gate or wicket 12. Thus the ledge prevents the gate from moving to the right when positioned as shown in Fig. 2, whereby to prevent the return of an animal that has passed under the gate, into the space between the gate and the entrance end of the casing.

A tiltable platform 14 is pivotally mounted on a pin 15 within the casing *a* and above the openings 6 and 8. This pivot pin 15 is so disposed that the platform will always tend to occupy a horizontal position but such tendency on the part of the platform is overcome by the presence of the ledge 13 and a projecting end portion 16 on the platform which is disposed in the path of the ledge, whereby to coöperate with the latter to prevent the platform from moving in one direction beyond that shown in Fig. 2. That end of the platform which is restrained by the ledge as shown in Fig. 2, carries a guard 17 which ascends with the platform under the weight of an animal positioned on part of the platform to the left of the pivot, whereby to prevent the entrance of a succeeding animal into the space below the platform when the platform is tilted from the position shown in Fig. 2, and further to increase the weight of the end of the platform on the right in the said Fig. 2, whereby to provide for the return of the platform to the position shown in Fig. 2 after the weight of the animal is removed therefrom.

The bait holder 18 is pivotally mounted as indicated at 19 within the casing *a* and positioned directly in front of the lower end of the platform 14. This bait holder is provided with a hook 20 for the bait 21 and the disposition of the hook is such as to hold the bait sufficiently high above the lower end of the platform to compel an animal to stand upright in order to have access to the bait. Now by so disposing the hook 21 it will be manifest that when the animal is standing upright and his fore feet placed on the bait or on the body 18 of the holder, the latter will yield to the left in Fig. 2 so that in the event of the hind feet of the animal being positioned to the right of the pivot 15 in Fig. 2 or the animal otherwise disposed on the platform so as to prevent the latter from tilting, the yielding of the bait holder will cause the animal to tread farther toward the lower end of the platform in order to follow up the bait and until such time as his weight overcomes the heavier end of the platform at which time the platform will tilt and owing to the large opening between the platform and the bait holder now had by these parts moving relatively to each other, precipitation of the animal into the body of liquid 22 in the tank, will be readily effected. When pressure is removed from the bait holder the same is moved to its normal position under the action of a weak retractile spring 23, and a stop 24 at the upper end of a plate 25 insures against overthrow of the platform to the left beyond the position shown in Fig. 2.

When desired to electrocute the trapped animal prior to precipitating it into the fluid receptacle $b$, I make use of a pair of contact plates 26—26 and arrange these on the opposite end portions of the platform 14. As shown at 27—27, these plates are insulated from the platform. The plates are connected to binding posts 28—28 and these in turn are connected by the conducting wires 29—29 to the binding posts 30—30 suitably connected to the side wall of the casing $a$. Electric circuit wires for the binding posts 30—30 are indicated by 31—31.

What is claimed as new is:

1. A trap comprising a casing provided at the bottom with an opening, a runway located in the casing and inclined upwardly from one end of the casing toward one end of said opening, and having a downwardly inclined inner end portion, a gate pivoted in the casing at a point between vertical lines intersecting the ends of the upwardly inclined bottom of the runway and normally resting at its free edge against the downwardly inclined end portion of the runway, and a platform pivoted in the casing at a point above the opening and normally lying in alinement with the downwardly inclined inner edge portion of the runway the lower edge of the platform normally lying at a level above the bottom of the casing and adapted to pass through the opening when the platform is swung.

2. A trap comprising a casing provided at its bottom with an opening, a runway located in the casing and inclined upwardly from one end of the casing toward one end of the said opening, and having a downwardly inclined inner end portion, a gate pivoted in the casing and normally resting at its free edge against the downwardly inclined inner end portion of the runway, a platform pivoted in the casing at a point above the opening and normally lying in alinement with the downwardly inclined portion of the runway, a spring held panel pivoted in the casing at a point above the opening and beyond the lower edge of the platform and a bait holder mounted upon the panel below the point of pivotal connection between the panel and the casing and above the lower edge of the platform.

In testimony whereof I affix my signature in presence of two witnesses.

CHARLES T. DARLING.

Witnesses:
 GEO. A. BYRNE,
 JOHN A. DONEGAN.

---

Copies of this patent may be obtained for five cents each, by addressing the "Commissioner of Patents. Washington, D. C."